United States Patent [19]

Kephart

[11] Patent Number: 5,062,931

[45] Date of Patent: Nov. 5, 1991

[54] ELECTROCHEMICAL POLISHING OF THREAD FASTENER TEST SPECIMENS OF NICKEL-CHROMIUM IRON ALLOYS

[75] Inventor: Alan R. Kephart, Scotia, N.Y.

[73] Assignee: The United States of America as represented by the United States Department of Energy, Washington, D.C.

[21] Appl. No.: 547,370

[22] Filed: Jul. 3, 1990

[51] Int. Cl.$^5$ .......................... B23H 3/10; C25F 3/16
[52] U.S. Cl. .......................... 204/129.7; 204/129.75; 204/224 M; 204/275; 204/293
[58] Field of Search ................ 204/224 M, 129.1, 293, 204/275

[56] References Cited

U.S. PATENT DOCUMENTS

| | | | |
|---|---|---|---|
| 2,650,979 | 9/1953 | Teubner | 204/224 M |
| 2,745,805 | 5/1956 | Jones, Jr. | 204/224 M X |
| 2,848,140 | 8/1958 | Knuth-Winterfeldt et al. | 204/224 M |
| 3,223,610 | 12/1965 | Inoue | 204/224 M |
| 3,658,684 | 4/1972 | Sickels | 204/275 |
| 4,601,803 | 7/1986 | Gregory | 204/224 M |
| 4,806,216 | 2/1989 | Kephart et al. | 204/129.7 X |

Primary Examiner—Donald R. Valentine
Attorney, Agent, or Firm—James C. Haight; William R. Moser; Richard E. Constant

[57] ABSTRACT

An electrochemical polishing device and method for selective anodic dissolution of the surface of test specimens comprised, for example, of nickel-chromium-iron alloys, which provides for uniform dissolution at the localized sites to remove metal through the use of a coiled wire electrode (cathode) placed in the immediate proximity of the working, surface resulting in a polished and uniform grain boundary.

7 Claims, 3 Drawing Sheets

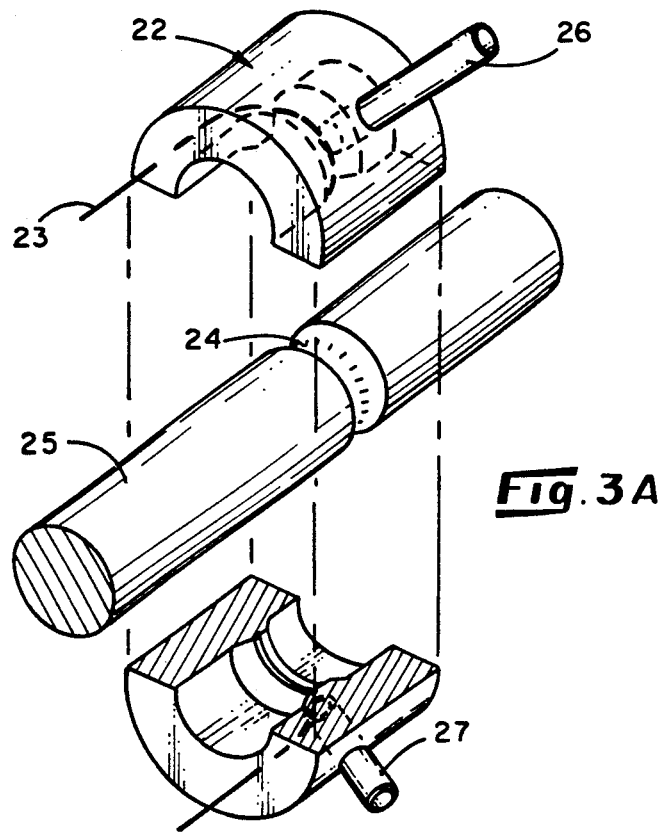
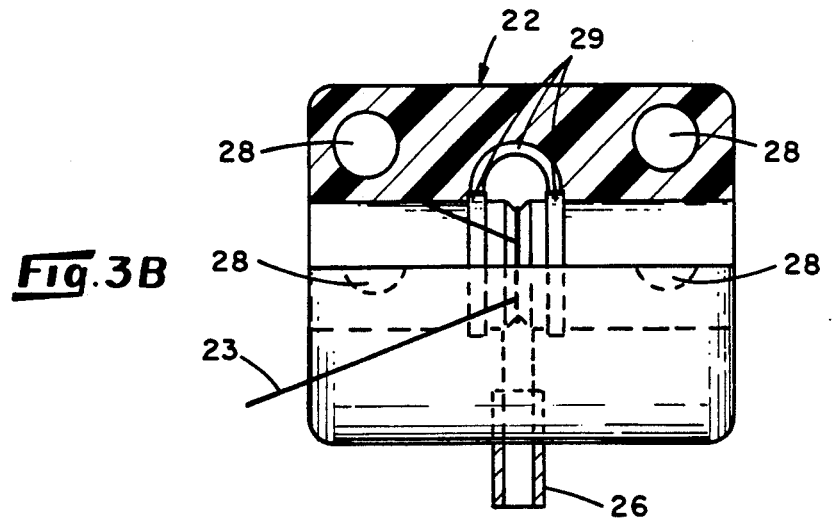
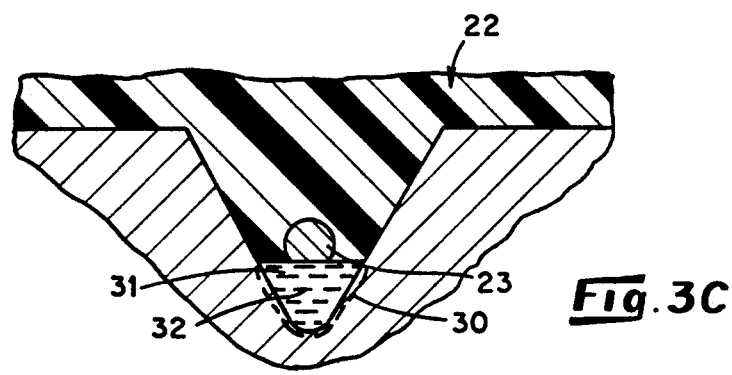

ELECTROCHEMICAL POLISHING OF THREAD FASTENER TEST SPECIMENS OF NICKEL-CHROMIUM IRON ALLOYS

BACKGROUND OF THE INVENTION

This invention relates to a device for selective electrochemical polishing, more specifically, to an apparatus for removing the surface layer of material at localized areas of alloy test specimens. The Government has rights in this invention pursuant to Contract No. DE-AC12-76-SN00052 awarded by the U.S. Department of Energy.

Heretofore, various electrochemical polishing techniques have been known and utilized for the purpose of surface treatment of various alloy materials by the use of anodic dissolution which utilized bulk circulating electrolytes and large surface electrodes remote from the desired surface to be removed. These techniques would cause metal removal from all of the exterior test specimen surfaces but would not be advantageous in facilitating controlled and uniform surface removal from localized areas. U.S. Pat. Nos. 3,793,169 and 3,816,272 address local selective removal of metal by electropolishing. However, the methodology is not considered applicable to specialized materials such as threaded fasteners or uniaxial notched test specimens. Furthermore, these disclosures do not identify or recognize the need to assure and produce metal surfaces which are free from metal grain boundary attack.

SUMMARY OF THE INVENTION

Therefore, it is an object of the present invention to provide an apparatus to remove the surface layer of material at localized areas which will overcome the above-noted disadvantages.

It is a further object of the present invention to provide a system which facilitates the selective localized anodic dissolution of the surface of alloy test specimens.

A further object of the present invention is to provide a system for the electrochemical polishing of test specimens through the selective anodic dissolution of the surface at localized areas through the use of a coiled wire electrode placed in the immediate proximity of the working surface.

Yet a further object of the present invention is to provide a controlled uniform dissolution of surface material of test specimens by means of electrochemical polishing intended to remove the surface machining affected zone or layer.

Still, a further object of the present invention is to provide an apparatus for the removal of the surface layer material at localized areas such as the roots of threads, bolt head fillets or notch regions of round specimens.

The foregoing objects and others are accomplished in accordance with the present invention, generally speaking, by providing an electrochemical polishing (ECP) apparatus comprising a DC power supply, a conductive metal electrode to serve as the cathode in the apparatus placed at the site where localized dissolution of the material is to take place, an electrically insulating enclosure or housing containing the metal cathode and providing a flow path for the electrolyte in the system between the workpiece or test specimen area and the associated cathode, and the test specimen or workpiece itself which serves as the remaining electrode or anode to complete the system. The insulating enclosure or body containing the electrode (cathode) and the electrolyte flow path or orifice is generally constructed from a cold setting plastic resin material. Prior to casting of the respective insulating body defining the flow path, the shape of which is determined by the configuration of the test specimen to be treated, a wire electrode is preformed or embedded in the electrically insulating enclosure such that it partially protrudes from the cast plastic fixture body in the vicinity of the boundary or selected surface portion of the test specimen from which metal removal is to be realized. Slots are machined selectively into the ends and sides of the body or housing for insertion of acid resistance "O" ring seals to avoid air and electrolyte leakage. The configuration provides for selective anodic dissolution of the surface at the defined areas of the test specimens in the regions which contain local residual stresses and externally applied stresses which in combination normally determine the stress dependent properties of the materials. The controlled uniform dissolution of the surface material by means of the instant electrochemical polishing (ECP) process and apparatus is intended to remove the surface layer at the machined zone, a major uncontrolled variable which usually has a confounding affect on the test results involving crack initiation properties of materials.

The present invention is intended to remove residual stresses from component areas which are most susceptible to stress failure and crack growth. It has an application to a broad range of test specimens used to provide test data in which the various effects of surface machining are mitigated. Typical testing of properties of materials benefiting from the instant electrochemical polishing surface preparation are crack initiation due to fatigue, corrosion fatigue and stress corrosion. The results of the use of the ECP process and device of the present invention will be applicable to the basic material being tested rather than a combined result of test specimen surface and base material properties. The system of the present invention potentially enables an increase in performance margin contributing to system reliability based on the determination of the true properties of structural materials.

It has been determined in the course of the present invention that by providing an electrode selectively juxtaposed to the specific boundary of a test specimen metal, that upon introduction of an electrolyte and application of the desired potential, selective localized removal of the surface layer of the metal can be realized in a uniform manner such that critical dimensions of the test specimen and test loading fixture dimensional compatibility can be preserved. This capability is facilitated by the use of the local electrode placed in immediate proximity to the working surface and the use of an electrolyte which is sufficiently conductive and fluid to flow rapidly by the working surface to flush out the metal's dissolution products. Without discharge of the chemical reactants from the ECP metal dissolution region, the required uniformity, surface smoothness and freedom from grain boundary attack would be compromised. The ECP process and device of the present invention provides for this discharge of the chemical reactants and produces a critical test surface from which the surface machining induced residual stresses and distressed metal is removed.

BRIEF DESCRIPTION OF THE DRAWINGS

The invention is further described by way of the accompanying illustrations wherein:

FIG. 3(A) shows a disassembled isometric view of the principal components of the ECP device as it relates to a notch root surface of a uniaxial type laboratory test specimen;

FIG. 3(B) shows a magnified cross section view of the assembled device of 3(A); and FIG. 3(C) shows an enlarged view of the ECP device assembly at the site of the metal removal.

DETAILED DESCRIPTION

Figure 1A:
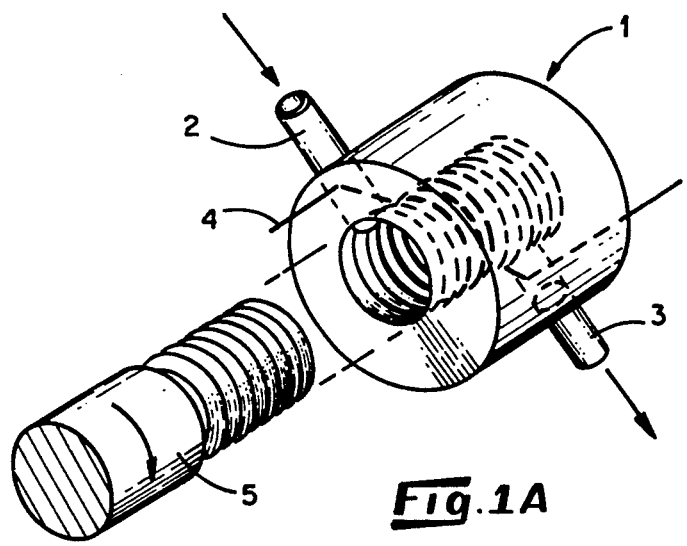
FIG. 1(A) represents the principal parts of the electrochemical polishing configuration of the present invention relating to a thread root surface of a threaded fastener test specimen.

Referring now to FIG. 1(A), there is seen the principal components of the electrochemical polishing device of the present invention as it relates to a threaded fastener. An insulating electrode flow path body 1 provides a flow path for the electrolyte having an electrolyte inlet 2 and electrolyte outlet 3. An electrode (cathode) 4 is embedded in the insulating electrode body such that it partially projects from the surface thereof at the boundary of the test specimen from which the metal is to be removed. The test specimen 5 upon insertion or threading into the insulating electrode body 1 provides the second electrode to complete the circuit and serves as the anode in the configuration. Thus, electrolyte is introduced into the electrolyte inlet 2, passes by way of the flow path defined within the insulating electrode body 1 and exits via the electrolyte outlet 3, flushing with it the metal removed from the surface of the test specimen. In the case of the present illustration, the test specimen is a threaded fastener and the electrochemical polishing is being realized at the thread root surface of the threaded fastener test specimen.

Figure 1B:
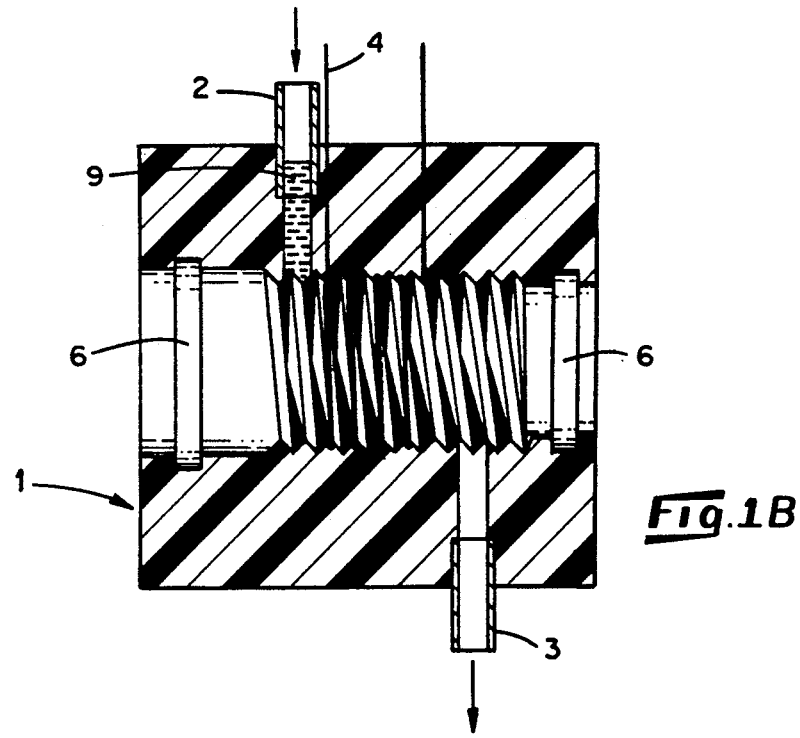
FIG. 1(B) shows a magnified cross-section view of the assembled components of the ECP device of FIG. 1(A)

FIG. 1(B) shows a cross section of the insulating electrode body after the test specimen 5 has been assembled to the electrode body 1. The electrode (cathode) wire 4 is seen in the assembled format positioned within the threaded portion of the fastener juxtapositioned to the root of the thread of the test specimen 5. O-rings 6 are provided to seal the configuration to prevent air from entering the flow path of the electrolyte or from preventing leakage of the electrolyte 9.

Figure 1C:
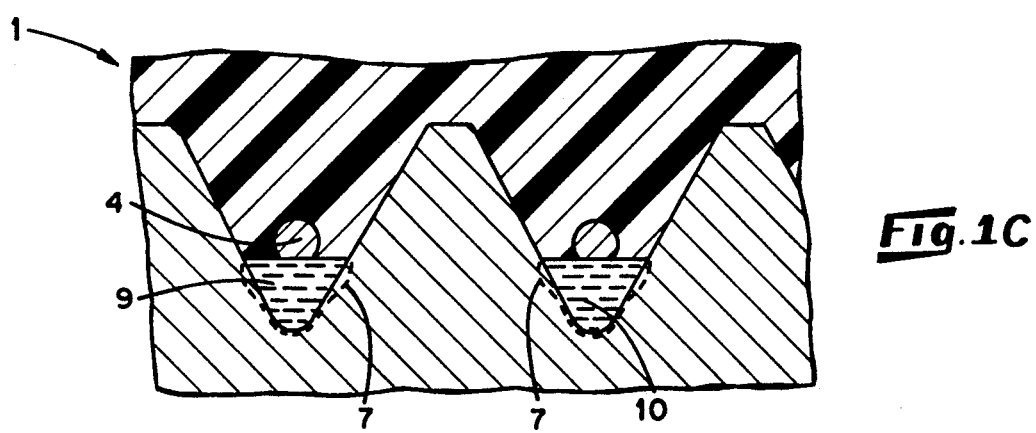
FIG. 1(C) shows an enlarged view of the ECP device assembly at the site of metal removal.

Referring to FIG. 1(C), there is seen an enlarged view of the ECP device assembly at the root of the threads. The insulating electrode body 1 contains the electrode (cathode) wire 4 such that the metal wire partially protrudes from the insulating body into the immediate vicinity of the boundary at the test specimen 7 where the metal removal is taking place as a result of the electrolyte 9 flowing through the electrolyte flow path at the thread root with the metal filaments 10 being flushed from the electrolyte outlet of the insulating electrode body.

Figure 2A:
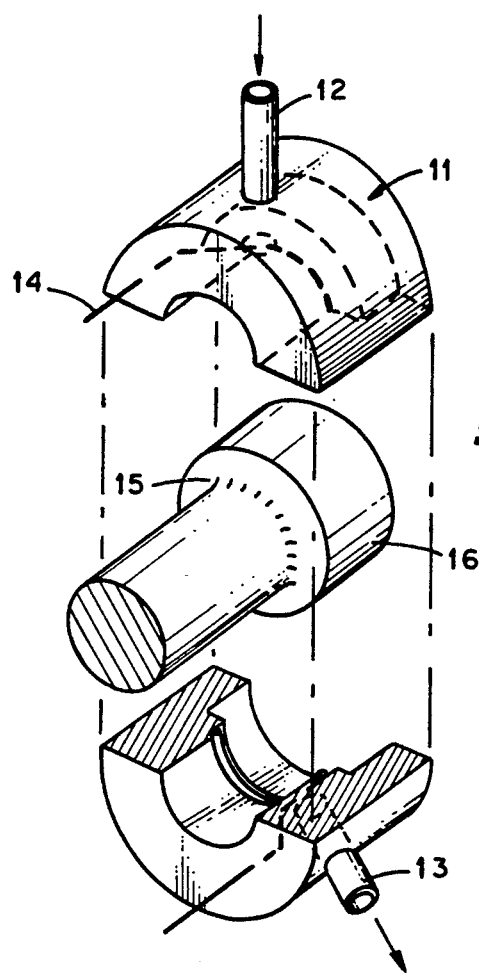
FIG. 2(A) shows a disassembled isometric view of the principal components of the ECP device as it relates to a bolt head fillet surface of a bolted fastener test specimen.

FIG. 2(A) represents an electrochemical polishing device and method of the present invention as it relates to the selective treatment of the bolt head fillet surface of a bolted fastener test specimen. FIG. 2(A) represents an isometric view of the disassembled device consisting of an insulating electrode body 11, one half of which provides for the electrolyte inlet 12 and the other half providing for the electrolyte outlet 13. The electrode (cathode) 14 is embedded in the insulating electrode body 11 such that upon assembly of the device the electrode (cathode) 14 is partially exposed from the insulating electrode body 11 at the site of the bolt head fillet 15 of the test specimen (anode) 16.

Figure 2B:
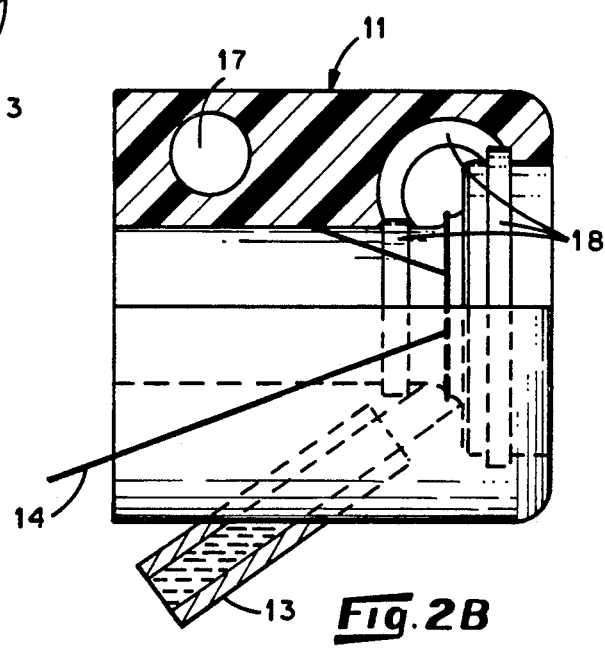
FIG. 2(B) shows a magnified cross section view of the assembled ECP device of FIG. 2(A)

FIG. 2(B) shows a magnified cross section view of the assembled device of FIG. 2(A) wherein the insulating electrode body 11 is provided with mating depressions 17 for accurate assembly of the respective halves of the insulating electrode body. O-ring seals 18 are provided for sealing off the electrolyte flow path.

Figure 2C:
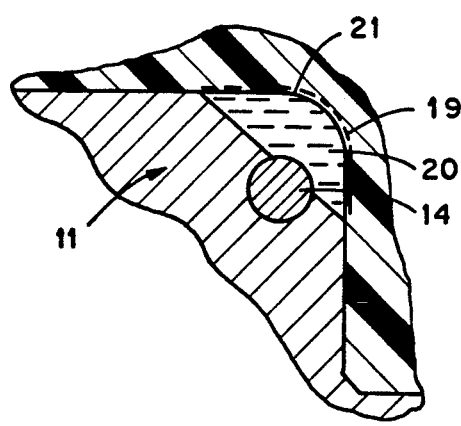
FIG. 2(C) shows an enlarged view of the ECP device assembly at the site of metal removal of a bolt head fillet.

FIG. 2(C) represents an enlarged view of the ECP device assembly at the bolt head fillet of the test specimen. The insulating electrode body 11 has the electrode (cathode) 14 embedded therein partially protruding into the zone juxtapositioned to the boundary 19 of the test specimen where metal removal takes place during the electrochemical polishing process. The electrolyte 20 selectively removes the metal material 21 which is flushed from the system by way of the electrolyte outlet.

FIG. 3(A) represents still a further application and method of the present invention in the electrochemical polishing of a notch root surface of a uniaxial type laboratory test specimen. The insulating electrode body 22 has an electrode (cathode) 23 embedded therein partially protruding into the zone juxtaposed to the boundary 24 of the test specimen (anode) 25 where metal removal takes place during the electrochemical polishing process. The electrolyte is introduced at the electrolyte inlet 26 and leaves via the electrolyte outlet 27.

FIG. 3(B) shows a magnified cross section view of the assembled device of FIG. 3(A) wherein the insulating electrode body 22 is provided with mating depressions 28 for accurate assembly of the respective halves of the electrode body. O-ring seals 29 are provided for sealing off the electrolyte flow path defined by the electrolyte inlet 26 the assembled insulating electrode and flow path body 22 and the electrolyte outlet 27.

FIG. 3(C) represents an enlarged view of the ECP device assembly at the notch root of the test specimen. The insulating electrode body 22 has the electrode (cathode) 23 embedded therein partially protruding into the zone juxtaposed to the boundary 30 of the test specimen where metal removal takes place during the electrochemical polishing process. The electrolyte 31 selectively removes the metal material 32 which flushed from the system by way of the electrolyte outlet.

The electrochemical polishing process and apparatus of the present invention results in the production of a critical test surface from which the surface machining induced residual stresses and distressed metal has been removed. The selective removal of the metal from the localized areas prevents the confounding effects imparted by the presence of the distressed metal and allows the applied stress related crack initiation properties of the materials to be properly measured for fatigue, corrosion fatigue and stress corrosion cracking.

A typical application of the device and process of the present invention employs a nickel-chromium alloy electrode as the cathode, and an aqueous electrolyte solution of sulfuric-nitric acids for anodic dissolution of the nickel-chromium alloy material. The electrolyte generally is provided so as to be sufficiently conductive in fluid such that it can be pumped through the established flow path to the working surface to serve both to etch away the metal and flush out the dissolution products resulting in a polished and uniform grain boundary. The electrolyte includes a metal solvent which is usually an acid mix. An example of electrolyte employed for nickel-based alloys is one of equal parts by volume of nitric acid, sulfuric acid, and water. Typical current densities employed range from 1 to 3 amperes per sq. cm. at a DC potential of from 2 to 8 volts. Typical electrolyte flow velocities at the site of metal removal range from 1 to 10 feet per second. Typical times required to remove the machined surface zones up to 0.005 inches range from 2 to 10 minutes.

The subject matter of the present invention is designed to remove only the surface layer at the localized areas defined such as the root of the threads, the bolt head fillets or notch region of a round specimen shape. Because of the local selective metal removal, critical dimensions of the test specimen and test loading fixture dimensional compatibility can be preserved while providing a means of control and uniform surface removal.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electrochemical polishing device comprising an electrically insulating body having:

a) cathode means partially protruding therefrom juxtaposed to a site of;
    b) a sealed electrolyte flow path which permits electrolyte to flow rapidly by the site of metal removal to flush out the metal's dissolution products; and
    c) means for receiving a threaded fastener test specimen which functions as an anode housed within said electrical insulating body, the root surface of the thread portions of said fastener providing the surface from which metal is to be removed juxtaposed to said cathode means within said electrolytic flow path.

2. The device of claim 1, wherein said anode comprises a bolt head fillet and said surface to be treated lies at the root surface of the bolt head fillet.

3. The device of claim 1, wherein said anode comprises a notch root surface and said surface to be treated lies at the notch root surface.

4. The device of claim 1, wherein the cathode is a nickel-chromium alloy electrode.

5. A method for electrochemically polishing machined metal surfaces of a threaded fastener to produce a surface from which surface machining-induced residual stresses and distressed metal have been removed, which comprises:

a) juxtaposing a the root surface of the threaded portion of said threaded fastener from which metal is to be removed in a sealed electrolyte flow path within an electrical insulating body with a nickel-chromium alloy cathode partly protruding therefrom; and
    b) flowing an aqueous solution of sulfuric acid and nitric acid through said flow path and across the site of metal removal on a test specimen acting as an anode to flush out the metal's dissolution products and produce said electrochemically polished surface.

6. The method of claim 5, wherein the test specimen comprises a bolt head fillet and the surface to be treated lies at the root surface of the bolt head fillet.

7. The method of claim 5, wherein the test specimen comprises a notch root surface and the surface to be treated lies at the notch root surface.

* * * * *